Patented Feb. 2, 1926.

1,571,891

UNITED STATES PATENT OFFICE.

ROY G. TELLIER, OF CHICAGO HEIGHTS, ILLINOIS, ASSIGNOR TO THE PERMUTIT COMPANY, OF NEW YORK, N. Y., A CORPORATION OF DELAWARE.

ART OF SOFTENING WATER.

No Drawing. Application filed May 27, 1916. Serial No. 100,312.

*To all whom it may concern:*

Be it known that I, ROY G. TELLIER, a citizen of the United States, residing at Chicago Heights, in the county of Cook and State of Illinois, have invented a new and useful Improvement in the Art of Softening Water, of which the following is a specification.

My invention relates to certain improvements in the art of softening hard water. More particularly, the invention is concerned with the preparation and use of a new water-softening material for acting upon the dissolved salts of calcium and magnesium to which the hardness of water is due.

Such new material is prepared from natural clay, that is, unctuous earthy matter consisting essentially of aluminum silicate, and having in admixture therewith a greater or less proportion of double silicates of aluminum and a more electropositive metal, an alkali metal or an alkaline earth metal, or both; said silicates being of zeolitic nature and having exchange properties.

To prepare such a material for use as a water-softening re-agent, it must be brought into such a form as to present extensive surfaces to the water to be softened, and it is further essential for practical purposes that the material be in such form that it will not go into suspension, but will retain its cohesion. I have found that it is most desirable to so treat the natural clay as to reduce it to a coarse pulverulent or granular condition, the individual granules having sufficient hardness to resist crushing when formed into a bed and being so bound that they will not disintegrate and go into suspension or wash away, resisting the powdering action of water. The clay, having been brought into this physical condition, can be formed into a filter-bed, permeable to water and presenting to the water drawn through the same extensive surfaces of active material.

A preferred method of treating the natural clay to bring it to such condition is to subject it to a low baking temperature, by which it is dried and hardened. The dried and hardened mass may then be crushed to the desired degree of fineness, for instance, the fineness of small gravel or very coarse sand. When reduced to this size, the material is loosely packed in a suitable container to form a filter-bed for the water to be softened. Upon passing the hard water through a mass of such material, it is found that, by a chemical action in the nature of that taking place in softening of water by natural and artificial zeolites, the alkali metal (sodium or potassium) contained in the material of the filter-bed is exchanged for the alkali earth metal (calcium or magnesium) in the salts of the hard water, changing these salts to sodium or potassium salts. As in the case of the zeolites referred to, the action is found to be a reversible one, that is, when the active material in the filter-bed has spent itself, exchanging all of its sodium or potassium for the calcium or magnesium of the water, a solution of sodium or potassium chloride may be passed through the filter, and, the solution being of sufficient concentration according to the laws of mass action, the alkali earth metals will replace the alkali earths in the filter-bed. By this simple and well understood process, the latter may therefore be rengerated and rendered capable of softening a further quantity of hard water.

In most instances, it will be found of benefit to initially regenerate the clay, either before or after, or both before and after, baking same. Some few varieties of clay contain a sufficient proportion of alkali metal to form efficient water-softening re-agents without such regeneration, but in almost every instance, the exchange capacity of the material may be greatly enhanced by such initial regeneration.

In order that the invention may be better understood, I will give a specific example of the method which I follow in treating a particular natural clay for rendering the same suitable for use as a water-softening re-agent.

The clay which I have found best suited to this purpose occurs in Fall River County, S. D., and has the following typical analysis:

|  | Per cent. |
|---|---|
| $SiO_2$ | 52.51 |
| $TiO_2$ | .41 |
| $Al_2O_3$ | 25.72 |
| $Fe_2O_3$ | 6.40 |
| $CaO$ | 2.40 |
| $Na_2O$ | 2.21 |
| $K_2O$ | .16 |
| $M_gO$ | Trace |
| Water and organic matter | 10.19 |
|  | 100 |

The clay is mined preferably in relatively large masses, and in shipment to the place of treatment every effort is made to retain it in its natural moist condition and to prevent it from weathering or disintegrating.

On being received at the place of treatment, the material is cut, while still moist, into small lumps. As a measure of the size of the lumps, I have found it desirable to adopt the following standard: the greatest distance from the core of any lump to the nearest surface thereof not to exceed one-half inch. When so cut, the material is immersed in a twenty-five per cent solution of sodium chloride, maintained at a temperature of 95° to 100° C. It may here be noted that the best balance between economy of time and cost and chemical efficiency is obtained by making use of a solution in which the sodium chloride is about eight times the mass of the calcium or magnesium (calculated as oxides) in the batch of clay treated. To maintain this proper balance, it is necessary, after treatment of one batch of clay with the solution, to add sodium chloride to the latter in sufficient quantity to offset the loss by re-action, and preferably in somewhat greater quantity than this, to balance the calcium and magnesium chlorides formed by the re-action and now present in the solution. By the continuous addition of sodium chloride, for instance one and one-half times in mass the mass of the calcium and magnesium oxides in each batch of clay treated, the same solution may be used for the treatment of about four charges, at the end of which time the concentration of the calcium and magnesium chlorides has risen so far as to make it uneconomical to further employ the same solution. The time of immersion of the clay in the hot sodium chloride solution will vary in accordance with the size of the lumps treated. I find that for the smallest lumps the time should not be less than forty minutes, and for the largest lumps, as gauged by the standard set above, two hours and twenty minutes is required. Immersion for a greater length of time has a tendency to soften the clay unduly, and since this length of time is required to permit the solution to penetrate to the core of the lumps, it will be seen that it is of importance that they should not exceed the limit given for size.

After removal from the sodium chloride bath, the lumps of clay are spread thinly in trays and allowed to slowly harden at normal indoor atmospheric temperatures, being carefully protected from sun and weather. The time required for the hardening process varies with the exact temperature and with the humidity of the atmosphere, being usually between five and fifteen days. At the end of this time, the clay has become sufficiently hard so that it does not readily break between the fingers, and when broken shows a clean fracture with no sign of scaling.

The material is now ready for final finishing, drying and hardening. The drier used should preferably be of the direct heat type, permitting the carbon-dioxide resulting from combustion of the fuel to come into direct contact with the material, which is advantageous as making for greater hardness of the same. The temperature in the drier should be regulated to remain below 110° C., even lower temperatures than this being advantageous, but requiring a somewhat longer period of treatment. If the material is in proper condition when placed in the drier, the drying operation may be completed, using the maximum temperature given, in twenty-four hours, and at the end of this time, the lumps, on being broken open, are of a uniform grayish-white color all the way through and feel dry and smooth to the hand.

After the drying operation, the material should be granulated as soon as possible, and if stored, must be kept in a dry place, since it readily absorbs moisture from the atmosphere. The size of the granules is not dictated by any chemical considerations, but purely by the mechanical requirements of the art of filtration. I find that granules which will pass through a six-mesh screen are well suited for forming into a filter-bed for ordinary sized installations. If practical conditions permit, a smaller mesh should be used, since the exchange capacity or speed of the re-agent seems to be almost directly in proportion to the extent of the surface of the same.

To increase the hardness and thereby lengthen the life of the material under conditions of use, it is now placed in a medium high temperature furnace for a heating treatment, preferably in a slightly oxidizing atmosphere. The time required in the furnace varies directly with the size of the grain and the volume or dimensions of the mass of material as it rests in the furnace. The temperature of the furnace should not exceed 775° C. for the best results, and may be materially lower than this. Before entering the charge, a period of treatment of from forty minutes to one and one-half hours will be found sufficient.

This heat treatment bakes the material, driving out all uncombined water and most of the combined water as well, reducing the granules to a baked or partially sintered form.

From the furnace the material is poured directly, while still hot, into a quenching and hydrating bath composed of a twenty-five per cent sodium hydroxide solution. If the temperature of heat treatment of material is substantially below 700° C., it is preferable, however, to use a bath of sodium chloride. To complete the re-hydration process, the material is either left in the same solution or put into another like solution, and the whole brought to just under the boiling point for a period of from twenty minutes to one hour and twenty minutes, depending upon the size of the grain. When the grains, on being broken open, show that they have changed all the way through from a light reddish or yellowish brown (their color as they came from the furnace) to a smooth, glossy, dark-brown color, the material has been sufficiently hydrated and without injuring its mechanical hardness. In this connection, it should be borne in mind that while the hydrating of the material increases its chemical efficiency, that is, its capacity for exchanging its base for the base of the hard water salts, the mechanical hardness, and consequently the life, of the material is sacrificed in the same measure. It is therefore necessary to strike a proper balance between length of life and chemical efficiency, and to adjust the hydration accordingly.

The same considerations govern the temperatures to be used in the heat treatment. The use of high temperatures approaching 775° C. effects more complete de-hydration, reducing the chemical efficiency of the product, but at the same time increasing the mechanical hardness and life. Lower temperatures, particularly temperatures in the neighborhood of or below 700° C. do not effect such complete de-hydration, and therefore give a product of greater chemical efficiency but of inferior hardness and shorter life. I prefer to use the process above described, in which the higher temperatures of heat treatment are employed, and the material is subsequently re-hydrated to a certain extent.

While I have described in considerable detail a specific manner of carrying out my new process of producing a water-softening re-agent from a particular natural clay, it is to be understood that this description is illustrative only and for the purpose of making clear the principles underlying the invention. I do not regard the invention as limited to these detail steps of procedure, or any of them, except in so far as such limitations are included in the terms of the following claims, in which it is my intention to claim all novelty inherent in my invention as broadly as is permissible in view of the prior art.

What I claim as new and desire to secure by Letters Patent is—

1. The step in the process of softening waters which consists in subjecting such waters to the action of extensive surfaces of a reagent comprising the class of bodies occurring in nature as clays and containing a substantial proportion of alkaline metal silicate.

2. The steps in the process of softening waters which consist in subjecting extensive surfaces of the class of bodies occurring in nature as clays and containing a substantial proportion of alkaline earth silicates, to the action of a solution of the salt of an alkali metal whereby the said alkaline earth silicate is converted into alkali metal silicate, and then subjecting the said hard water to the action of extensive surfaces of the said bodies so converted, whereby the salts of the alkaline earth metal of the water are converted into salts of the alkali metals.

3. The process of making an article for softening hard water from naturally occurring hydrated silicate materials of zeolitic character containing a relatively electropositive metal and having exchange properties, which consists in baking such a material at a temperature sufficient to drive off all the uncombined water but not all the combined water therein, such temperature being sufficient to harden the material enough to enable it to resist the disintegrating action of water without permanent destruction of the exchange properties.

4. A process for forming a water softening material, which consists in baking a silicate containing aluminum at a temperature between 500 and 700° C.

5. A process of forming a water softening material which consists in baking a silicate containing aluminum at a temperature sufficient to drive off all the uncombined water, but not all the combined water, and subjecting the material to treatment with common salt.

6. As an article of manufacture, a material for water softening purposes, consisting of a baked and unfused double silicate of aluminum and a more electropositive metal.

7. The process of forming a water softening material, which consists in subjecting to the action of a solution of a salt of an alkali metal a clay containing a substantial proportion of alkali earth, and drying and hardening the material so treated at a temperature below 100° C.

8. The process of forming a water softening material, which consists in subjecting to the action of a solution of a salt of an alkali metal a clay containing a substantial portion of alkali earth, drying and hardening the material so treated at a temperture below 100° C, and baking the material so treated at a temperature sufficient to drive off all the uncombined water.

9. The herein described process which consists of treating a mineral having for its base a hydrated silicate of aluminum by adding salt to said mineral and then baking said mineral without fusing the same until it is hard enough to resist the powdering action of water.

10. The herein described process of producing a water softening material which consists of treating a mineral consisting of a natural clay and having the characteristic that it is capable of softening water by base exchange, by adding salt to said mineral and then baking said mineral without fusing the same until it is hard enough to resist the powdering action of water.

11. In the preparation of a water softening material adapted for use in a granular bed, the process which comprises treating a soft silicate material containing a hydrated silicate of aluminum of zeolitic nature and having exchange properties by adding salt to said mineral and then baking said mineral at a temperature which will harden it sufficiently to enable it to resist the disintegrating action of water but not at such a temperature as to fuse said material or detrimentally affect its exchange properties.

12. The process of preparing a material for softening water adapted for use in a granular bed which comprises baking and granulating a soft hydrated silicate material of clayey consistency and containing components of zeolitic nature having exchange properties; the baking being conducted at such a temperature and under such conditions that the soft clayey consistency of the material is changed to a hard and rigid consistency without destroying the exchange properties, alkaline earths contained in such material being replaced by sodium by means of a treatment with common salt prior to the baking operation.

13. In the softening of hard water, the process which comprises transmitting such a water through a granular bed containing highly pervious granules of a baked clayey material containing a substantial proportion of a hydrated silicate of zeolitic nature and having exchange properties.

14. In the softening of hard water, the process which comprises transmitting such a water through a granular bed containing highly pervious granules of a baked clayey material containing a substantial proportion of a hydrated silicate of zeolitic nature and having exchange properties, such bed being submitted in alternation to the action of a common salt solution and to that of the water to be softened.

15. In the process of making a material adapted for softening hard waters and for use in a granular bed, the step which comprises baking a soft silicate material containing aluminum and components of zeolitic nature having exchange properties, the baking being conducted at a temperature between 500 and 700° C.

16. In the preparation of a water softening material adapted for use in granular beds, the process which comprises baking a soft hydrated silicate material containing double silicates of zeolitic nature and having exchange properties, at a temperature such that it hardens and such that all the uncombined water but not all the chemically combined water is driven off.

17. In the preparation of a water softening material adapted for use in granular beds, the process which comprises baking a soft hydrated silicate material containing aluminum silicate of zeolitic nature and having exchange properties at a temperature such that it hardens and such that all the uncombined water but not all the chemically combined water is driven off and subjecting the material to treatment with common salt.

18. In the treatment of soft natural zeolitic material having exchange properties and containing replaceable calcium or magnesium, the process of forming hard granular masses adapted for use in granular beds, which comprises a baking of such material at such a temperature and under such conditions as to give the material hardness and rigidity without materially impairing the exchange properties and a treatment with a compound of an alkali metal to replace such calcium or magnesium by alkali.

19. The process of preparing a material for softening water adapted for use in a granular bed which comprises baking and granulating a soft hydrated silicate material of clayey consistency and containing components of zeolitic nature having exchange properties; the baking being conducted at such a temperature and under such conditions that the soft clayey consistency of the material is changed to a hard and rigid consistency without destroying the exchange properties, alkaline earths contained in such material being replaced by sodium by means of a treatment with common salt.

20. The process of preparing a material for softening water adapted for use in a granular bed which comprises freeing a soft hydrated silicate material of clayey consistency and containing components of zeolitic nature having exchange properties, of much of the contained water, baking to change the clayey consistency to a harder consistency and granulating.

21. As an article of manufacture, a material for softening water adapted for use in a granular bed comprising a body of baked and unfused granules containing a double silicate of aluminum and a more electropositive metal, such silicate being of zeolitic nature and having exchange properties.

22. As an article of manufacture, a material for softening water adapted for use in a granular bed comprising a body of baked and unfused granules containing a double silicate of aluminum and an alkali metal, such silicate being of zeolitic nature and having exchange properties.

23. In the preparation of a water softening material adapted for use in granular beds, the process which comprises baking a soft hydrated silicate material containing silicates of zeolitic nature and having exchange properties, at a temperature such that it hardens sufficiently to enable it to resist the disintegrating action of water.

24. A process for preparing a water softening material which consists in adding salt to a mineral consisting of a natural clay and having the capability of softening water by base exchange, allowing the mineral to dry and then baking the mineral at a temperature such that all the uncombined water is driven off.

25. The process of preparing a material having exchange properties and suitable for use in a granular bed from natural materials comprising a hydrated silicate of aluminum, which comprises heating such material in a bath of sodium chlorid solution at a temperature around 100° C., and then drying.

26. The process of preparing a material having exchange properties and suitable for use in a granular bed from natural materials comprising a hydrated silicate of aluminum, which comprises heating such material in a bath of sodium chlorid solution at a temperature around 100° C., and then hardening by drying and baking at a high temperature until nearly all the combined water is driven off.

27. In the preparation of a water softening material adapted for use in granular bed softeners from hydrated silicate material of a zeolitic nature and containing $Al_2O_3$, $Fe_2O_3$ and an alkali metal oxid, such material in its natural condition disintegrating in water, which consists in baking such material at such temperature that the baking will harden it sufficiently to enable it to resist the disintegrating action of water, the temperature being sufficiently low so that the baking does not permanently destroy its exchange properties.

ROY G. TELLIER.